United States Patent

[11] 3,546,425

| [72] | Inventors | Willem F. Idsenga<br>Nijmegen;<br>Pieter G. Weeber, Beek Ubbergen,<br>Netherlands |
|---|---|---|
| [21] | Appl. No. | 741,353 |
| [22] | Filed | July 1, 1968 |
| [45] | Patented | Dec. 8, 1970 |
| [73] | Assignee | Smit Nijmegen Elektrotechnische Fabrieken N.V.<br>Nijmegen, Netherlands |
| [32] | Priority | June 29, 1967 |
| [33] | | Netherlands |
| [31] | | No. 67/09071 |

[54] CONSTANTLY SUPPLIED WIRE ELECTRODE AND SUPPLEMENTAL WELDING METAL
2 Claims, 2 Drawing Figs.

[52] U.S. Cl. .................................................. 219/131, 219/145
[51] Int. Cl. .................................................. B23k 9/00
[50] Field of Search .......................................... 219/74, 76, 130, 137, 145, 146

[56] References Cited
UNITED STATES PATENTS

| 1,760,534 | 5/1930 | Whiting et al. ............... | 219/146X |
| 2,432,048 | 12/1947 | Stretton ........................ | 219/146 |
| 2,806,128 | 9/1957 | Muller .......................... | 219/146 |
| 3,045,110 | 7/1962 | Schneider et al. ............ | 219/146 |
| 3,221,136 | 11/1965 | Freeth et al. .................. | 219/146 |

FOREIGN PATENTS

| 385,372 | 3/1965 | Switzerland .................. | 219/136 |

Primary Examiner—Joseph V. Truhe
Assistant Examiner—C. L. Albritton
Attorney—Stevens, Davis, Miller & Mosher ABSTRACT: Supplemental welding metal in the form of a welding wire coiled in a helix is provided. The coiled wire is placed around a constantly supplied wire electrode fed to a welding arc formed between the work piece and the wire electrode. Additional welding metal may be supplied from one or more additional welding wires coiled in a helix and placed around the first coiled welding wire.

PATENTED DEC 8 1970
3,546,425
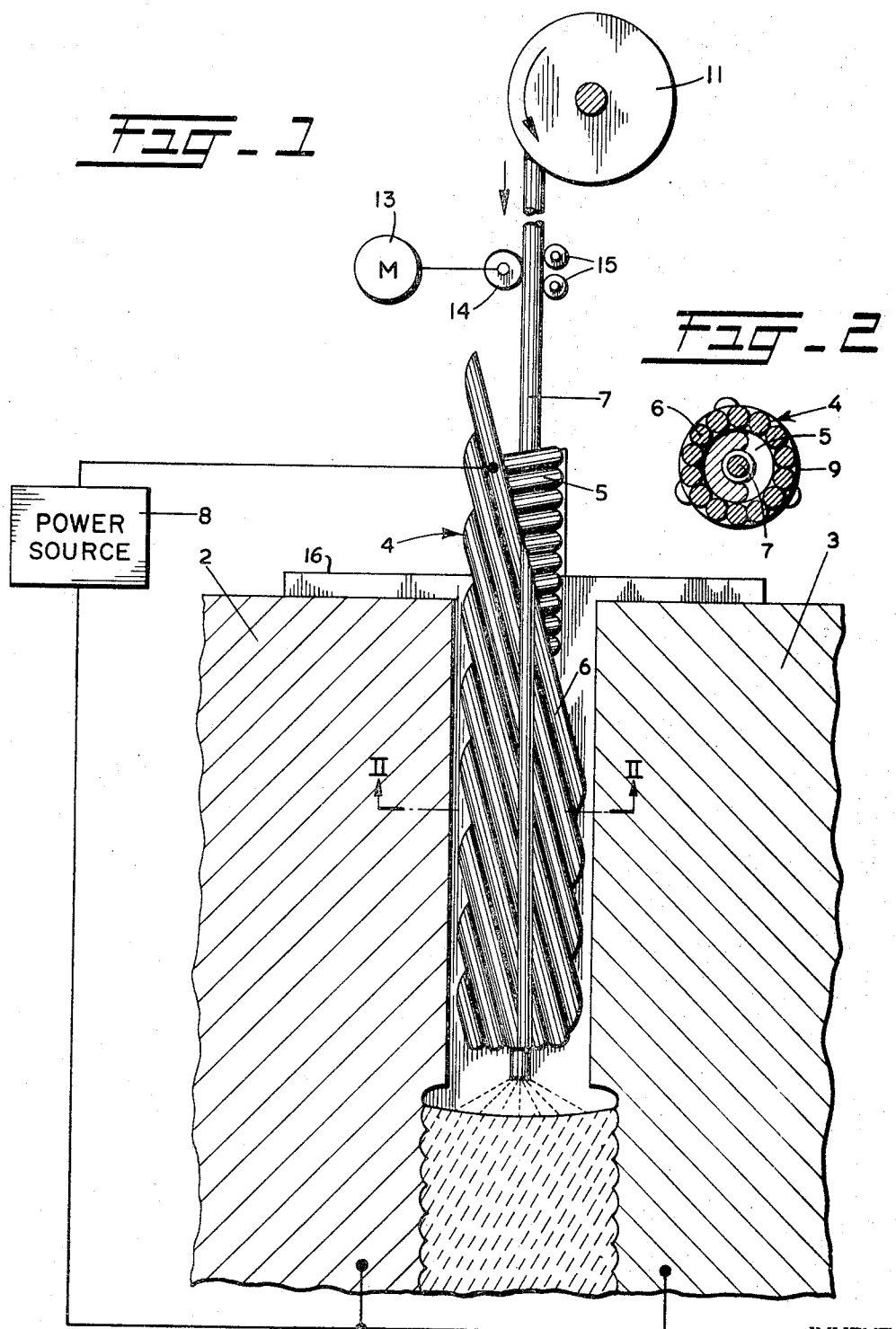
Fig_1
Fig_2
INVENTORS
WILLEM F. IDSENGA,
PIETER G. WEEBER
BY Stevens, Davis, Miller & Mosher
ATTORNEYS

CONSTANTLY SUPPLIED WIRE ELECTRODE AND SUPPLEMENTAL WELDING METAL

The invention relates to a method of welding and to supplemental welding metal. In particular, the invention relates to a method of welding with a constantly, mechanically supplied wire electrode which is fused by an electric arc formed at the end of the wire electrode. The supplemental welding metal surrounds the wire electrode and is also fused by the heat generated in the arc.

In a prior art method disclosed in Dutch Pat. specification No. 107,105 a thick-walled tube is used as the supplemental welding metal, said tube surrounding the wire electrode. This prior art method, however, presents drawbacks. For instance, the thick-walled metal tube of supplemental welding metal is exceedingly difficult to obtain, because such thick-walled tubes are not ordinarily available on the market with the material components required and within the strict limits required of the material components. Moreover the metal tubes have to be specially made which entails high costs. Another drawback in using the thick-walled tube for the supplemental welding metal is the fact that the industry cannot possibly supply such thick-walled tubes to every length required for the seams to be welded. The lengths of the seams may vary considerably, so that these tubes, if available at all, can be expected to be supplied in arbitrary standard lengths which in nearly all cases means a loss for the consumer because of the remaining tube ends. A further drawback is that the thick-walled tubes of supplemental welding metal are ordinarily only supplied in straight form and with limited lengths; consequently, long seams cannot be welded without interruption. Then again, there is the problem of the coating used with the thick-walled tubes of supplemental welding metal. The coating preferably forms the flux for the weld puddle. Such coatings are always brittle and have a particularly poor ductibility. For this reason, the thick-walled tubes when provided with a coating which produces flux have to be constructed in rigid usually straight form. The ordinary straight thick-walled tubes, therefore, cannot be effectively used for welding seams with curves, because to bend the tubes is out of the question.

It is an object of the present invention to avoid the drawbacks mentioned above.

It is a further object of the invention to provide supplemental welding metal in the form of a welding wire coiled in a helix.

It is another object of the invention to provide a method of welding using a supplemental welding metal a welding wire coiled in a helix.

The welding wire to be coiled into a helix as supplemental welding metal can readily be obtained on the market within the required limits of material components. The wire can be coiled into a helix of any required diameter and any required length without there remaining any tube ends of supplemental welding metal, as the welding wire can be obtained in practically unlimited lengths on coils.

Particularly when wires of small diameter are used, the helically coiled wire may melt prematurely because of the generation and conduction of heat in the helically coiled welding wire. To prevent the premature melting, the wire coiled in a helix may be provided with a number of welded beads with small section running roughly parallel to the wire electrode. The welded beads are applied after winding the wire in a helix and connect two adjacent turns mechanically and electrically. As a result less heat will be generated in the coiled welding wire.

The helical supplemental welding wire may also be covered with one or more additional layers of welding wires coiled in a helix of very large pitch as compared with the pitch of the aforementioned helical wire. Around the whole, a thin layer of isolating and, by the heat of the arc, meltable material can be applied, for instance a layer of knitted glass fibre, or in the form of a strip or band.

The invention will now be illustrated by the following description with reference to the accompanying drawing showing embodiments of the construction. In the drawing, like numerals denote like parts.

FIG. 1 shows, partly in section, a welding arrangement for the method according to the invention.

FIG. 2 shows a cross section of the supplemental welding metal, central wire electrode, and layer of isolating material taken along II–II in FIG. 1.

In the exemplary illustrated arrangement according to FIG. 1, the welding seam is between the plates 2 and 3. In said welding seam the supplemental welding metal 4, shown in FIG. 2, is introduced, consisting of a welding wires 5 and 6, each coiled in a helix. Welding wire 5 has a small pitch substantially equal to the diameter of said wire, around which welding wires 6, coiled in a helix having a relatively large pitch have been arranged. If desired, additional welding wires may be placed over wire 6. For purposes of clarity, the isolating layer 9 is not shown in FIG. 1, but is shown in FIG. 2.

A wire electrode 7, which is supplied from rotatable supply reel 11, is introduced through the tube of supplemental welding metal 4 formed in this way, while one terminal of the welding current source 8 is connected, as shown schematically, to the supplemental welding metal 4, which acts as an electrical contact nozzle conducting the electrical current to the wire electrode. The other terminal of current source 8 is connected, as shown schematically, to both plates 2 and 3. The electrical connections to plates 2 and 3 may be made via a starting plate, for example, as shown in Dutch Pat. specification No. 107,105. When the welding current source 8 is switched on, an arc is formed between the starting plate and the wire electrode 7. The heat of the arc causes the wire electrode 7, both the plates 2 and 3, and the auxiliary welding metal 4 to melt locally. As the end of electrode 7 is consumed, motor 13 drives roller 14 which contacts wire electrode 7, with the aid of free running rollers 15, thereby moving the electrode wire 7 from reel 11 toward the arc. The melting bath may be kept in the right form by copper casing 16 known per se and only one of which has been illustrated. The required fluxes can be added by pouring loose powder into the welding seam or by using a tubular cored wire as the wire 7, in which the flux material and, if desired, alloying media have been inserted.

Both of the first-mentioned helical wire 5 with small pitch and the helical wires 6 with relatively larger pitch can, for any given welding task be provided in any required diameter and length. The coils can be formed in a machine especially designed for the purpose.

Although the present invention has been described above with reference to particular arrangements, it is to be understood that changes and variations may be made without departing from the spirit and scope of the invention as defined in the appended claims.

We claim:

1. A consumable electrode for welding together plates and the like having opposing faces arranged with an intervening gap, the sides of which are closed by copper shoes, said electrode comprising a constantly supplied wire electrode and supplemental welding metal forming a nozzle and comprising a first helical coil of welding wire having a pitch equal to the diameter of said wire and at least one layer of juxtaposed further helically-coiled welding wire having a substantially larger pitch than the pitch of said first helical coil of welding wire, said constantly supplied wire electrode passing through said first helical coil to strike an arc, and means for applying electric current to said nozzle at the end remote from said arc.

2. A consumable electrode according to claim 1 further comprising at least one welded bead provided on each said helical coil and extending substantially the entire length thereof substantially parallel to said constantly supplied electrode whereby the heat of said arc is dissipated along said coils thereby preventing premature melting of each turn.